(12) United States Patent
Miyazaki (10) Patent No.: US 9,095,984 B2
(45) Date of Patent: Aug. 4, 2015

(54) FORCE CONTROL ROBOT

(75) Inventor: Yoshiyuki Miyazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 13/696,633

(22) PCT Filed: May 13, 2011

(86) PCT No.: PCT/JP2011/061603
§ 371 (c)(1),
(2), (4) Date: Nov. 7, 2012

(87) PCT Pub. No.: WO2011/145713
PCT Pub. Date: Nov. 24, 2011

(65) Prior Publication Data
US 2013/0054027 A1 Feb. 28, 2013

(30) Foreign Application Priority Data
May 20, 2010 (JP) ................................. 2010-116436

(51) Int. Cl.
*B25J 13/08* (2006.01)
*B25J 15/08* (2006.01)
*B25J 17/02* (2006.01)

(52) U.S. Cl.
CPC .............. *B25J 13/085* (2013.01); *B25J 15/08* (2013.01); *B25J 17/0208* (2013.01)

(58) Field of Classification Search
CPC .......... B25J 13/085; B25J 15/08; B25J 17/02; B25J 17/02338; B25J 9/1633; B25J 9/1638; B25J 19/027

USPC .................................................... 700/245–264
See application file for complete search history.

(56) References Cited

U.S. PATENT DOCUMENTS

| 3,984,006 | A | * | 10/1976 | Takeyasu et al. .............. 414/589 |
| 5,378,033 | A | * | 1/1995 | Guo et al. ...................... 294/116 |
| 2012/0007374 | A1 | | 1/2012 | Nakasugi et al. |

FOREIGN PATENT DOCUMENTS

| EP | 2181814 A1 * | 5/2010 |
| JP | 61-241083 A | 10/1986 |

OTHER PUBLICATIONS

Notification of Transmittal of the International Search Report and the Written Opinion of the International Searching Authority, the International Search Report, and the Written Opinion of the International Searching Authority dated Oct. 20, 2011.

*Primary Examiner* — Khoi Tran
*Assistant Examiner* — Adam Mott
(74) *Attorney, Agent, or Firm* — Fitzpatrick, Cella, Harper & Scinto (57) ABSTRACT

To realize a force control robot including a force sensor having a high sensitivity and a high rigidity, an end effector (1) including finger modules (100) for gripping a part is coupled to a robotic arm (3) through the intermediation of a force sensor (2), and the force sensor (2) detects an external force applied to the finger modules (100) based on displacement of the end effector (1) that occurs with a rotation center (C) on a longitudinal axis (Z) of the robotic arm (3) as a fulcrum, to thereby correct an operation of the robotic arm (3). An end effector housing (109) supports motors (105) for driving the finger modules (100) at a position on the robotic arm side with respect to the rotation center (C) of the force sensor (2). Accordingly, the rigidity of the sensor can be increased.

8 Claims, 8 Drawing Sheets

(PRIOR ART)

FORCE CONTROL ROBOT

TECHNICAL FIELD

The present invention relates to a force control robot for gripping parts for assembly by using an end effector.

BACKGROUND ART

In recent years, assembly automation has progressed for products having a small size and complex structure, such as cameras, which raises a demand for a small-size industrial robot for performing high-speed and precise assembly with fine control of force. In a conventional case, in order to assemble a gripped part precisely and reliably, a force sensor for detecting a force based on a change in output caused by displacement of a member is provided between a robotic arm and an end effector, to thereby control the arm and the end effector while detecting the force at the time of assembly by using the force sensor (see PTL 1).

Figure 7:
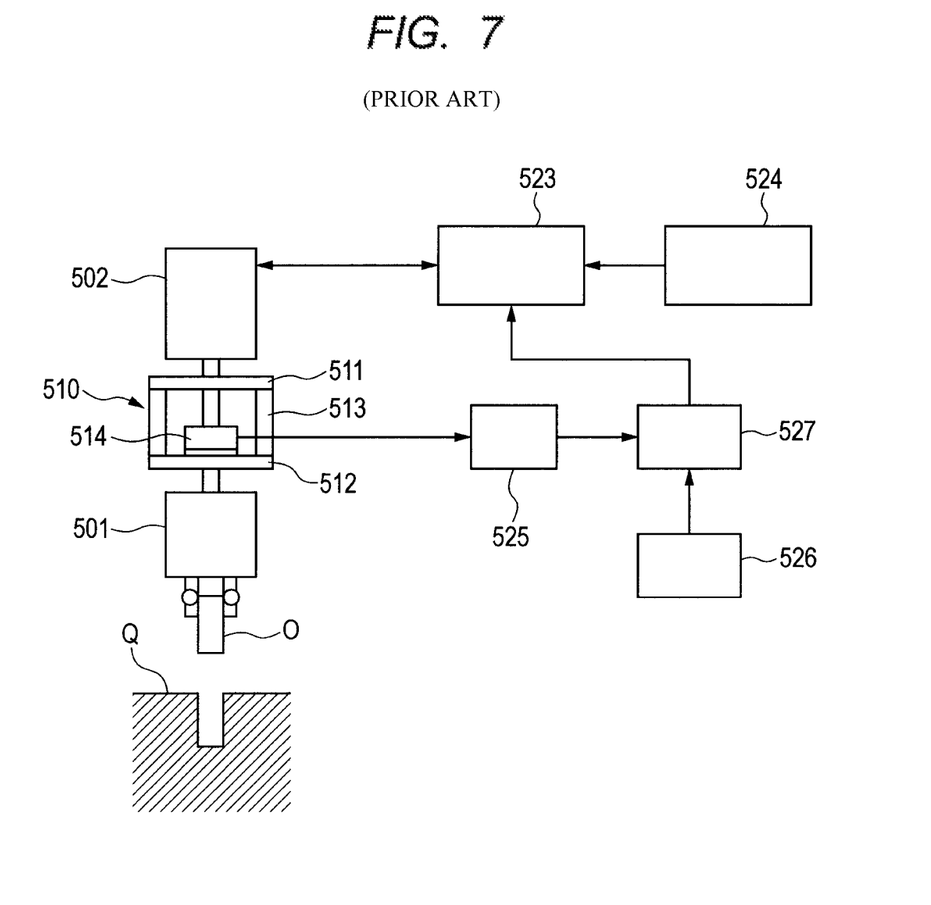
FIG. 7 is a schematic diagram illustrating the related art.

FIG. 7 illustrates the related art. The force control robot according to the related art includes a robotic arm 502, a force sensor 510, an end effector 501, and other components. The force control robot uses the end effector 501 to grip a part O, and assembles the gripped part O to a workpiece Q. The robotic arm 502 is driven by a driver 523, and a controller 524 is provided so as to input an operation signal and a position control signal for the robotic arm 502 to the driver 523.

The force sensor 510 includes an arm-side plate 511 fixed to the tip end of the robotic arm 502, an end-effector-side plate 512 fixed to the end effector 501, and an elastic member 513 for coupling and supporting both the plates 511 and 512. The force sensor 510 also includes a displacement detection mechanism between the plates 511 and 512. The displacement detection mechanism includes, on the arm-side plate 511, a beam 514 having a crossed tip end portion and extending toward the end-effector-side plate 512.

In the force control robot of the above-mentioned related art, the force sensor 510 is serially arranged between the robotic arm 502 and the end effector 501. Accordingly, the rotation center of the end effector 501 relative to the robotic arm 502, which exists inside the force sensor 510, is positioned apart from the center of gravity of the end effector 501. Therefore, due to the inertial force at the time of driving the robotic arm 502, the moment force generated by the positional difference between the displacement fulcrum of the elastic member 513 and the center of gravity of the end effector 501 is applied to the force sensor 510. As a result, the period of time to be required until the sensor portion is stabilized is long.

In order to reduce the stabilization period, it is necessary to increase the rigidity of the elastic member 513 of the force sensor 510. As a result, the sensor becomes less sensitive to the external force, leading to a decrease in detection sensitivity of the force sensor 510. In other words, precise force detection is difficult when the rigidity of the elastic member is increased. Thus, with the above-mentioned structure of the related art, as the end effector is downsized, it becomes difficult to attain both increasing the detection sensitivity of the sensor and ensuring a rigidity for supporting high-speed operation.

The present invention provides such a force control robot that an end effector can be downsized easily and high-speed operation can be supported with no decrease in detection sensitivity of a force sensor.

CITATION LIST

Patent Literature

PTL 1: Japanese Patent Application Laid-Open No. S61-241083

SUMMARY OF INVENTION

A force control robot according to the present invention includes: a robotic arm having one end as a fixed end and another end as a movable end; a robotic arm control portion for operating the robotic arm; an end effector coupled to the movable end of the robotic arm through intermediation of an elastic member, the end effector having a grip mechanism portion for gripping a part, a grip drive portion, and a housing for supporting the grip mechanism portion and the grip drive portion; and a force sensor correcting an operation of the robotic arm by detecting an external force applied to the grip mechanism portion based on displacement of the end effector that is caused by deformation of the elastic member, wherein the force control robot controlling the operation of the robotic arm based on the external force detected by the force sensor, and wherein a part of the grip drive portion is arranged on the robotic arm side with respect to a rotation center of the elastic member.

The part of the grip drive portion of the end effector is arranged on the robotic arm side with respect to the rotation center of the elastic member. Accordingly, the rigidity of the sensor can be increased and the end effector can be downsized. At the same time, the influence of the moment force generated due to the inertial force at the time of driving the robotic arm, which is to be imposed on the force sensor, is reduced. By reducing the period of time to be required for positioning and stabilization, high-speed operation can be supported and the operable range of the tip end portion of the robotic arm can be widened.

Further features of the present invention will become apparent from the following description of exemplary embodiments with reference to the attached drawings.

DESCRIPTION OF EMBODIMENTS

Figure 1A:
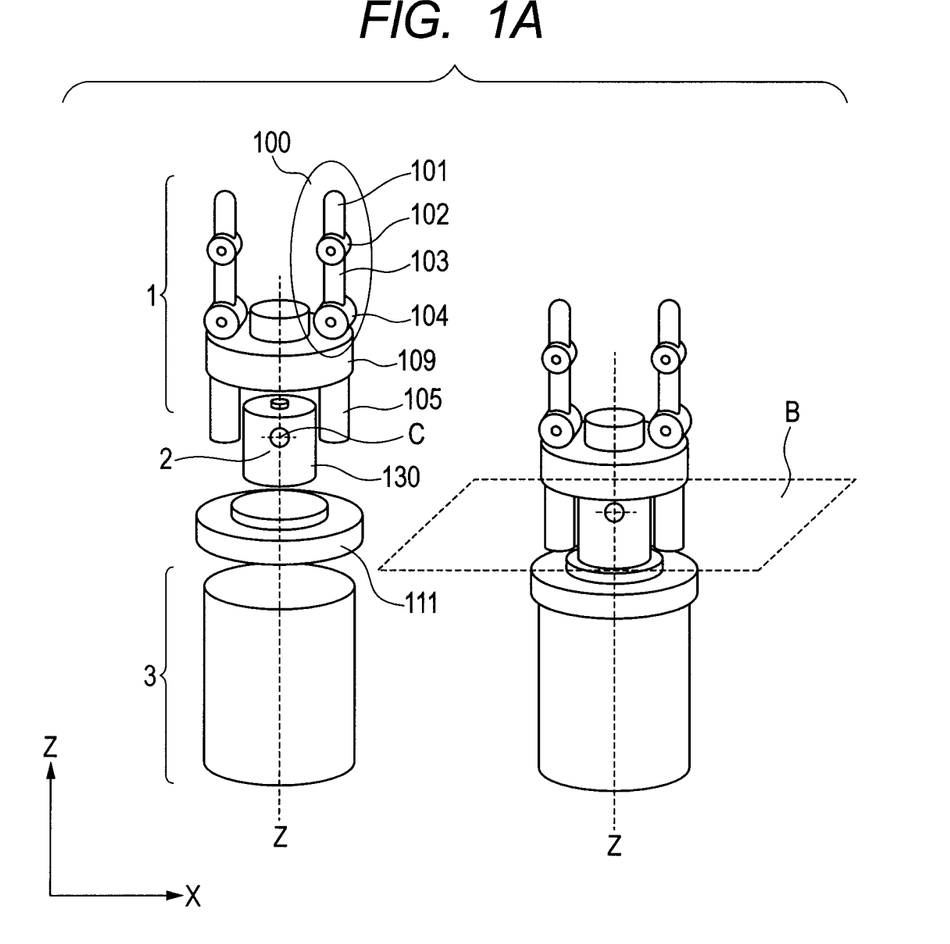
FIG. 1A is a schematic view illustrating a principal part of a force control robot according to an embodiment.

FIGS. 1A to 5A illustrate a force control robot according to an embodiment. The force control robot according to this embodiment is an industrial robot for assembling parts of, for example, a small-size product at high speed with force control. Referring to the schematic view of FIG. 1A, an end effector 1 includes multiple finger modules 100 for gripping a part, an end effector housing 109 for supporting the finger modules, and multiple motors 105 serving as a grip drive portion for the finger modules. The end effector housing 109 of FIG. 1A is a tubular or box-like member, which has a support portion plate and a wall portion 110, and protects the motors 105 and a force sensor 2. For the sake of description, only the support portion plate connected to the finger modules 100 and the motors 105 is explicitly illustrated. The force sensor 2 includes an elastic member 130, and detects deformation of the elastic member that occurs when an external force is received, to thereby detect the external force. For example, a strain gauge sensor or a magnetic force sensor is used.

Figure 1B:
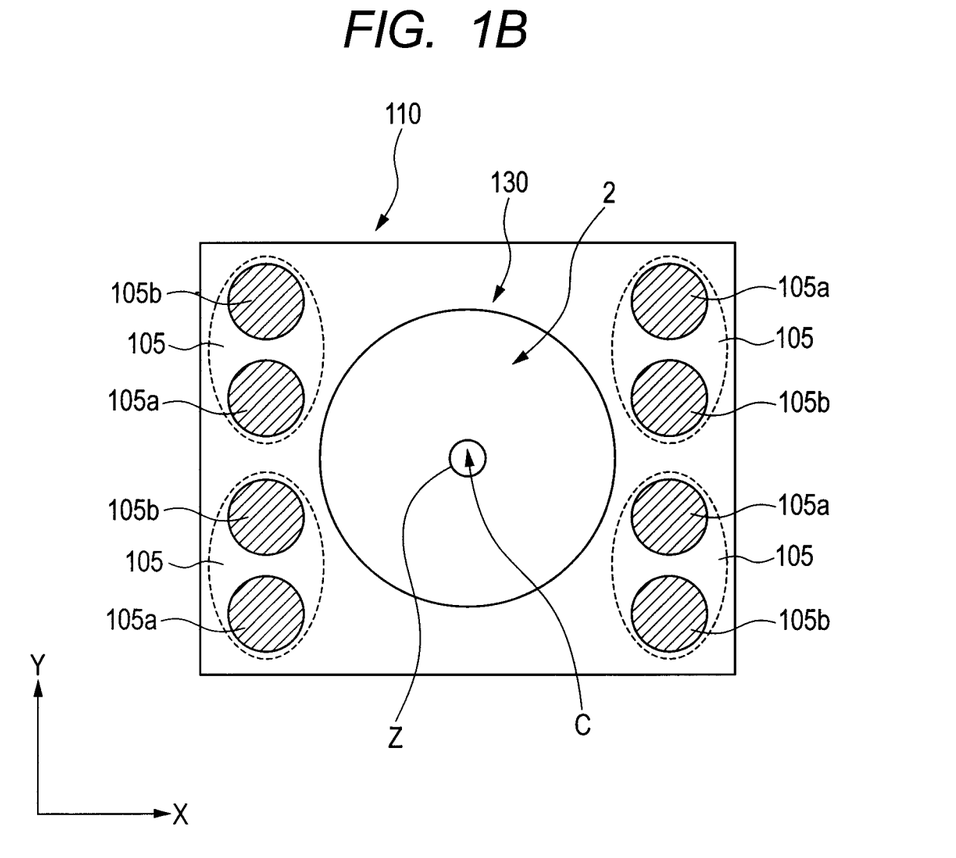
FIG. 1B is a sectional view illustrating a cross section indicated by the plane B that is defined by the broken line of FIG. 1A.

The finger modules 100 each include a fingertip member 101, a middle phalanx member 103, and a first joint 102 and a second joint 104 for their connection. FIG. 1B illustrates a vertical plane B, which is perpendicular to a longitudinal axis Z of a robotic arm 3, and includes a rotation center C. The motors 105 serving as the grip drive portion for the finger modules are supported by the end effector housing 109, and as illustrated in FIG. 1B, a motor 105a for driving the first joint 102 and a motor 105b for driving the second joint 104 serve to drive one finger module. Those motors may be driven independently by a controller (not shown), which enables gripping of workpieces in various shapes. The robotic arm 3 has one end as a fixed end that is fixed to a trestle, and the other end as a movable end. The end effector 1 is coupled to the movable end of the robotic arm 3 through the intermediation of the force sensor 2. As illustrated in FIG. 1A, the force sensor 2 may be fixed to the movable end of the robotic arm 3 through the intermediation of a plate 111.

With this structure, when an external force is applied to the end effector 1 due to the assembly operation or the like, the end effector 1 is displaced about the rotation center C relative to the robotic arm 3. In a case where the respective components are arranged substantially symmetrically across the longitudinal direction, the rotation center C exists on the longitudinal axis Z passing through a substantial center of the cross section orthogonal to the longitudinal direction of the robotic arm 3.

The end effector housing 109, which is a housing for supporting the motors 105, supports the motors 105 so that a part of the motors 105 is arranged on the robotic arm side with respect to the vertical plane B including the rotation center C of the end effector 1 across the longitudinal axis Z of the robotic arm 3.

The motors 105a and 105b for driving the four respective finger modules 100 are arranged on the periphery of the force sensor 2 substantially symmetrically across the longitudinal axis Z.

In this embodiment, the multiple motors 105 for driving the finger modules 100 are arranged symmetrically, but the motors 105 may be arranged concentrically with the force sensor 2. For the finger modules 100, the number of fingers and the number of joints are selected depending on the parts and the assembly operation, and hence the finger modules 100 may have a variety of end effector structures.

Figure 2:
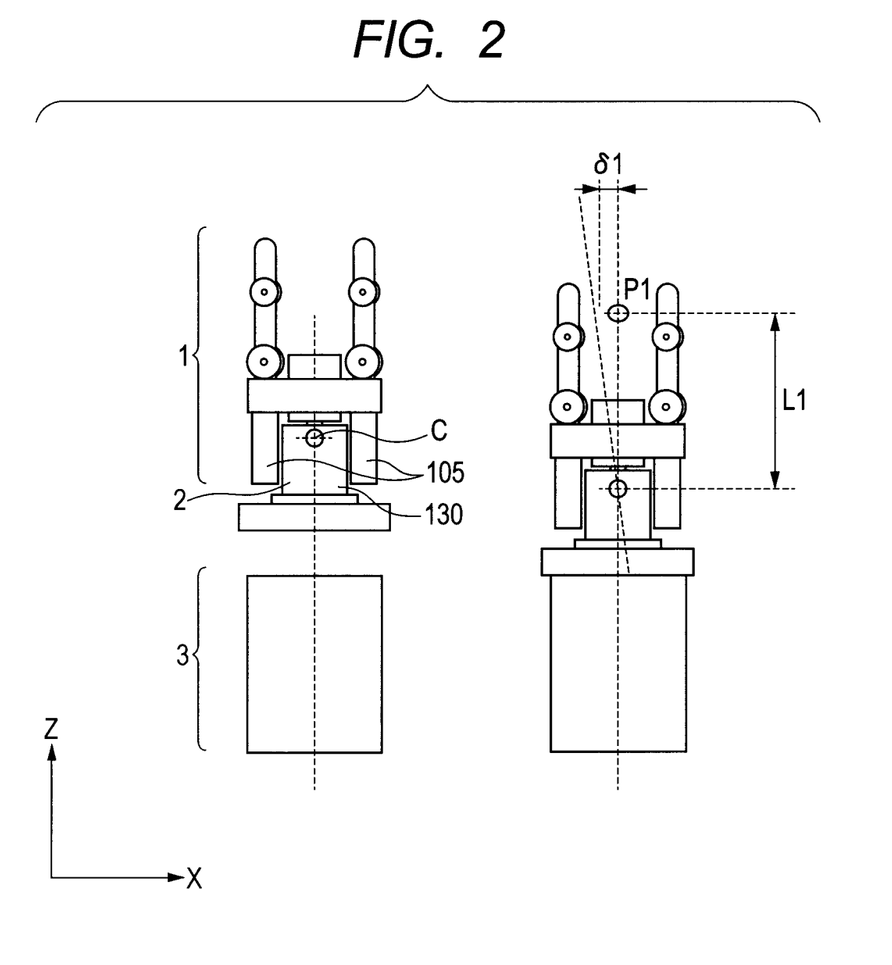
FIG. 2 is a side view of the force control robot of the present invention.

FIG. 2 is a side view of the end effector of this embodiment. FIG. 2 illustrates a state in which no external force is applied to the end effector 1, and it is assumed that the ascending direction in the drawing sheet is referred to as +Z direction; the rightward direction, +X direction; and the depth direction in the drawing sheet, +Y direction.

As illustrated in FIG. 2, the respective finger modules 100 are supported by the end effector housing 109, and can change their posture through the intermediation of the elastic member 130 of the force sensor 2.

In the force control robot of this embodiment, the end portion of the end effector 1 and the movable end of the robotic arm 3 are coupled to each other through the intermediation of the force sensor 2 including the elastic member 130 having a rigidity relatively smaller than both the end effector 1 and the robotic arm 3. Accordingly, when an external force is applied to the end effector, the end effector rotates about the rotation center C that exists inside the force sensor 2.

The force control robot of this embodiment has a feature in that the part of the motors, which serve as the grip drive portion and are high in weight, is arranged on the robotic arm side with respect to the above-mentioned rotation center C.

With this structure, the decrease in rigidity of the end effector can be suppressed while maintaining or increasing the sensitivity of the force sensor.

The motors are relatively high in weight, and hence a greater effect can be obtained when the centers of gravity of the motors serving as the grip drive portion are arranged on the robotic arm side with respect to the rotation center C.

Figure 3A:
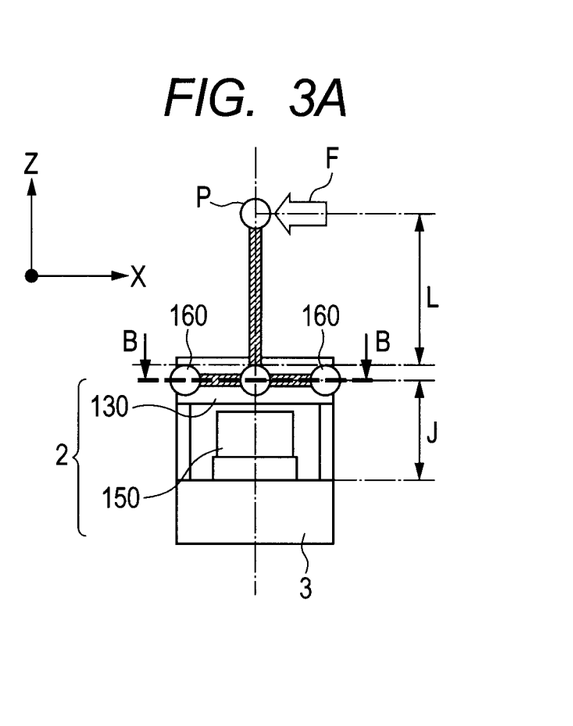
FIG. 3A is a schematic view of a force sensor for illustrating a force sensor of the force control robot of the present invention.
Figure 3B:
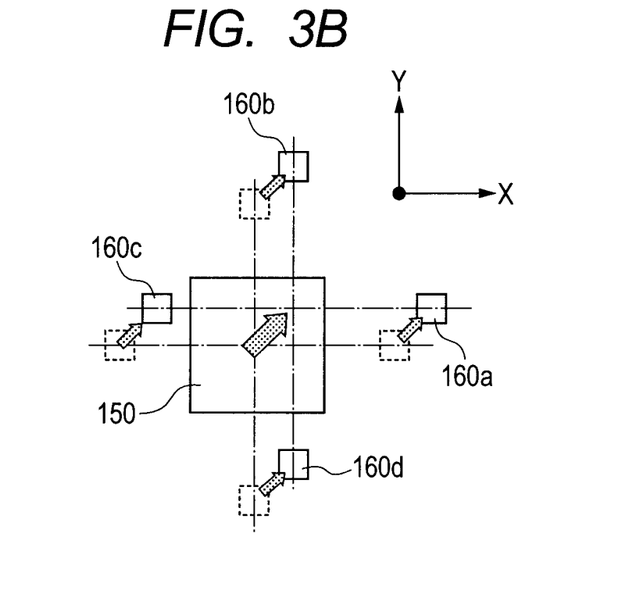
FIG. 3B is a sectional view illustrating a cross section taken along the line B-B of FIG. 3A.

FIG. 3A is a schematic view illustrating a structure model of the force sensor 2. FIG. 3B illustrates a cross section B of FIG. 3A. The force sensor 2 includes a top portion, a bottom portion, and a columnar portion for coupling the top portion and the bottom portion. The top portion and the columnar portion mainly serve as the elastic member 130.

For example, referring to FIG. 3B, the force sensor 2 includes a permanent magnet 150 and displacement detection elements 160a, 160b, 160c, and 160d that are Hall elements, the Hall elements are arranged on a lower portion of the elastic member 130 of the force sensor 2, and the permanent magnet 150 is fixed to the bottom portion of the force sensor 2 on an opposite side from the Hall elements.

When an external force F is applied to the end effector, there occurs relative displacement between the permanent magnet 150 and the respective Hall elements, and the intensity of the magnetic field that is detected by the Hall elements 160 changes. By detecting the amount of change in magnetic field, the rotation or displacement of the end effector 1 relative to the robotic arm 3 can be detected. The displacement detection elements 160a, 160b, 160c, and 160d (four elements in total) are arranged symmetrically across the permanent magnet 150 at +X, −X, +Y, and −Y positions on the displacement side of the elastic member 130. Accordingly, the displacement direction can be detected as well as the displacement amount.

If the applied force F at the time of assembly is applied to the end effector in the −X and −Y directions within the XY plane, the displacement detection elements 160a, 160b, 160c, and 160d are displaced in the +X and +Y directions relative to the permanent magnet 150. Therefore, the displacement detection elements 160a and 160b at the +X and +Y positions move away from the permanent magnet 150, with the result that the output thereof becomes smaller. On the other hand, the displacement detection elements 160c and 160d at the −X and −Y positions move closer to the permanent magnet 150, with the result that the output thereof becomes larger. Accordingly, the level and direction of the applied force F can be detected. The positional relationship between the permanent magnet 150 and the displacement detection elements 160a, 160b, 160c, and 160d may be reversed. In place of the method of detecting the displacement amount between the magnet and the Hall elements, a force sensor of strain gauge type or capacitive type may be used.

Figure 4:
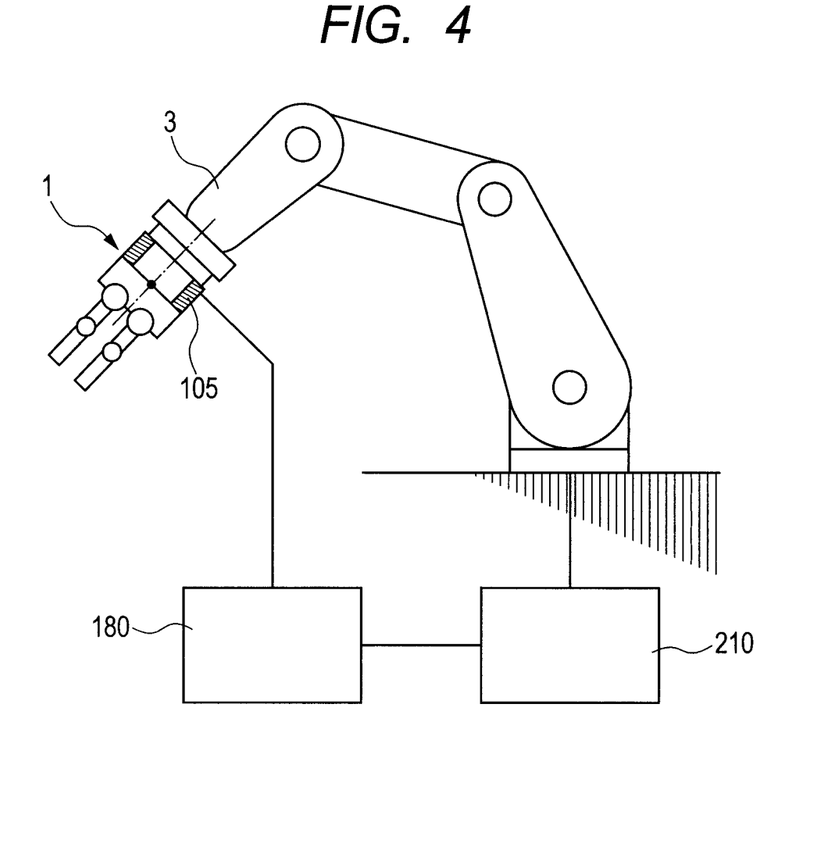
FIG. 4 illustrates the entire apparatus of the present invention.

FIG. 4 illustrates the entire force control robot in which the end effector 1 is mounted on the tip end of the robotic arm 3. The force control robot includes the robotic arm 3, the end effector 1 mounted on the robotic arm 3, and an end effector control portion 180. The end effector control portion 180 for controlling the operation of the end effector 1 is connected to the end effector 1, and the end effector control portion 180 also performs an arithmetic operation of converting a displacement signal detected by the force sensor 2 into a force. A robotic arm control portion 210 for controlling the operation of the robotic arm 3 is connected to the robotic arm 3. The robotic arm control portion 210 receives, from the end effector control portion 180, information on the external force applied to the finger modules 100 of the end effector 1, and reflects the information in the operation of the robotic arm 3.

A sequential flow of the assembly operation with force control is described assuming a case where a gripped part O is caused to abut against a workpiece that is an assembly counterpart when the gripped part O is assembled to the workpiece. Referring to FIG. 2, the applied force F at the time of assembly is transferred to the end effector housing 109 through the finger modules 100, and further the elastic member 130 is distorted with the rotation center C of the force sensor 2 as a fulcrum. The force sensor 2 detects the displacement amount and direction at this time, and the detected displacement information is transmitted to the end effector control portion 180. In the end effector control portion 180, an arithmetic portion performs an arithmetic operation to obtain the level and direction of the applied force F, which are transmitted to the robotic arm control portion 210. The robotic arm control portion 210 performs assembly while correcting the operation of the robotic arm 3 based on the transmitted information on the applied force F.

A distance L1 is defined as a distance between the rotation center C of the end effector of this embodiment illustrated in FIG. 2 and a point of application P1 that is a standard position of workpiece gripping. Further, a distance L2 is defined as a distance between the rotation center C of the end effector of the structure in the related art illustrated in FIG. 7 and a point of application P2.

In the force control robot in the related art illustrated in FIG. 7, the end effector 501 including the motors serving as the grip drive portion is fixed to the end portion of the force sensor 510. When a comparison is made under the same condition of the size of the force sensor 2 and the positional relationship between the permanent magnet 150 and the Hall elements 160 that are the displacement detection elements, the force control robot in the related art has a larger value of the distance, and hence the relationship between the distances from the rotation center C to the point of application is L1<L2. Further, referring to FIG. 2, a displacement amount δd1 is defined as a displacement amount at the time when the assembly force F generated at the time of assembly is applied as an external force to the point of application P1 of the end effector 1 through the workpiece, causing the displacement of the end effector 1. On the other hand, a displacement amount δd2 is defined as a displacement amount due to the external force in the case of the force control robot in the related art under the same condition.

Under the condition described above, δd1=L1/L2*δd2 is established, provided that the deformation amounts of the elastic member 130 of the force sensor 2 due to the external force are the same (the relationship between displacement amounts δh1 and δh2 of the displacement between the permanent magnet 150 and the Hall elements 160 is δh1=δh2). When assuming the same sensor sensitivity, the displacement amount δd can be suppressed by the value of L1/L2. When assuming the same displacement amount, that is, when assuming δd1=δd2, δh1=L2/L1*δh2 is established, and the sensor sensitivity can be increased up to a value multiplied by L2/L1 as compared to the force control robot in the related art.

When assuming that "M1" represents a moment of inertia of the end effector about the rotation center C in the structure of FIG. 2, and "M2" represents a moment of inertia of the end effector about the rotation center C in the structure of the force control robot in the related art, the moment of inertia increases by a weight of part of the motors 105 serving as the grip drive portion for driving the finger modules 100, the part of the motors 105 being arranged on the robotic arm side with respect to the rotation center C, that is, M1<M2 is established.

When assuming that "f1" and "f2" respectively represent the natural frequencies of the end effector in the structure of this embodiment and the end effector in the structure of the above-mentioned related art cited as a comparative example, the natural frequency f is expressed by $f=1/2\pi*\sqrt{(k/M)}$, and hence $f1/f2=\sqrt{(M2/M1)}$ is established. In other words, in this embodiment, the rigidity can be increased by a factor of $\sqrt{(M2/M1)}$ as compared to the structure in the above-mentioned related art cited as the comparative example. Accordingly, the drifting of the end effector that occurs when the robotic arm 3 is operated is suppressed, and the positioning/stabilization period is reduced, with the result that high-speed operation can be supported.

In other words, the grip drive portion is arranged on the robotic arm side with respect to the rotation center of the elastic member, and hence the detection sensitivity can be increased and the rigidity for supporting high-speed operation can be ensured.

Figure 5A:
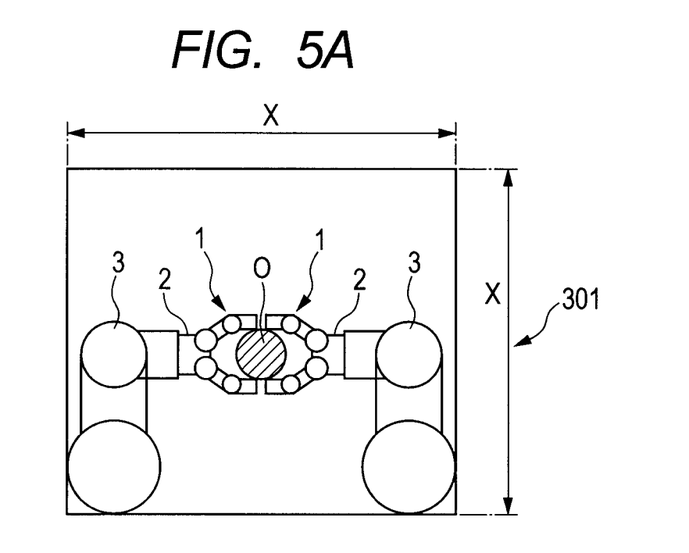
FIG. 5A is a top view of a robotic station to which an end effector of the present invention is applied.
Figure 5B:
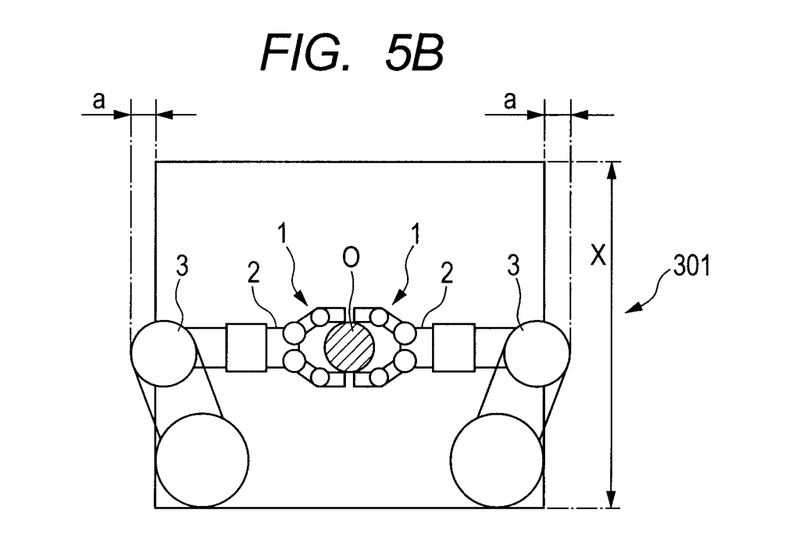
FIG. 5B is a top view of a robotic station to which an end effector of a structure according to a comparative example is applied.
Figure 6A:
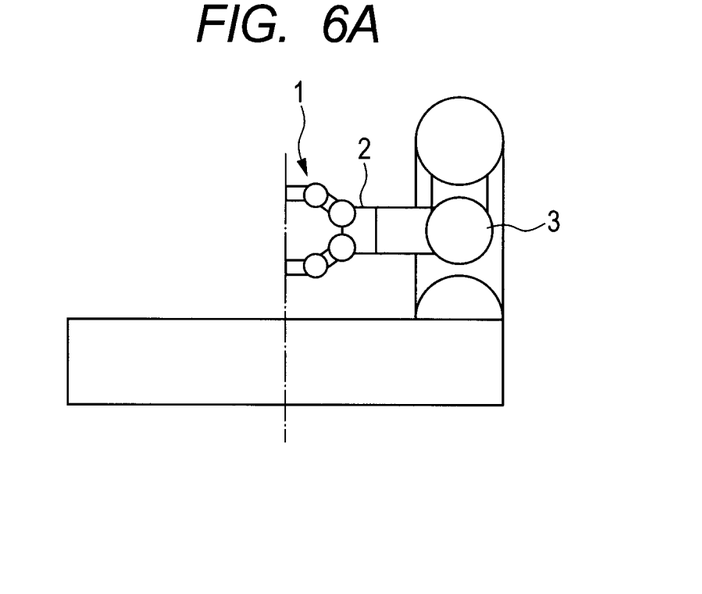
FIG. 6A is a side view to be referenced for comparison of the robotic station to which the end effector of the present invention is applied.
Figure 6B:
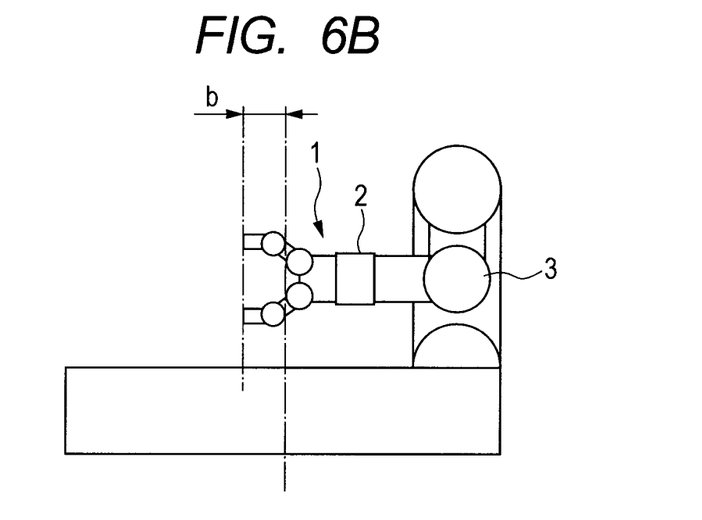
FIG. 6B is a side view of the robotic station to which the end effector of the structure according to the comparative example is applied.

FIGS. 5A to 6B are views to be referenced for comparison between an example in which the end effector 1 in the structure according to this embodiment is applied to an assembly robotic station and an example in which the end effector 1 in the structure according to the comparative example is applied to the assembly robotic station. FIGS. 5A and 5B are top views of a robotic station 301, and FIGS. 6A and 6B are side views thereof. Of FIGS. 5A to 6B, FIGS. 5A and 6A illustrate the example in which the end effector according to this embodiment is applied. FIGS. 5B and 6B illustrate the example in which the end effector in the structure according to the comparative example is applied.

The robotic station 301 is shaped like a square of sides X, and the end effectors 1 are mounted on a pair of the robotic arms 3, respectively. Both the arms grip the part O near the center of the robotic station 301 during the work. When assuming that "a" represents a difference in overall length between the end effector in the structure of this embodiment and the end effector in the structure of the related art, the width of the robotic station 301 can be reduced by an extension amount 2a of the robotic arms 3. In addition, in side view, by arranging the end effector close to the base of the robotic arm 3 by an amount b, the operable range of one robotic arm 3 can be widened.

INDUSTRIAL APPLICABILITY

The end effector according to the present invention is excellently applicable to, for example, an assembly robot because the sensor having a high rigidity can be realized without trading off the sensitivity of the force sensor.

REFERENCE SIGNS LIST 1 end effector
100 finger module
105, 105a, 105b motor
2 force sensor
130 elastic member
3 robotic arm
301 robotic station While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-116436, filed May 20, 2010, which is hereby incorporated by reference herein in its entirety.

The invention claimed is:

1. A force control robot, comprising:
a robotic arm having one end as a fixed end and another end as a movable end;
an end effector coupled to the movable end of the robotic arm, the end effector having a grip mechanism portion and a grip drive portion for moving the grip mechanism portion; and
a force sensor configured to detect an external force applied to the grip mechanism portion based on displacement of the end effector, the force sensor including an elastic member coupling the end effector to the movable end, the force sensor being positioned so that when the end effector is displaced with respect to the movable end about a rotation center, the rotation center exists inside the force sensor,
wherein the grip drive portion is positioned so that a center of gravity of the grip drive portion is nearer to the robotic arm than the rotation center.

2. A force control robot according to claim 1,
wherein the grip mechanism portion has a plurality of finger modules, and
wherein the grip drive portion has a plurality of motors respectively driving the plurality of finger modules.

3. A force control robot according to claim 2,
wherein the plurality of motors are arranged concentrically about the force sensor.

4. A force control robot according to claim 1,
wherein the force sensor includes a top portion, a bottom portion, and a columnar portion coupling the top portion and the bottom portion.

5. A force control robot according to claim 4,
wherein the top portion and the columnar portion serve as the elastic member.

6. A force control robot according to claim 4,
wherein a Hall element is arranged on the top portion, and a permanent magnet is arranged on the bottom portion.

7. A production method comprising:
assembling parts using the force control robot according to claim 1.

8. A robotic station comprising the force control robot according to claim 1.

* * * * *